(No Model.)
C. BRAAF.
FISH POND.
No. 550,476. Patented Nov. 26, 1895.
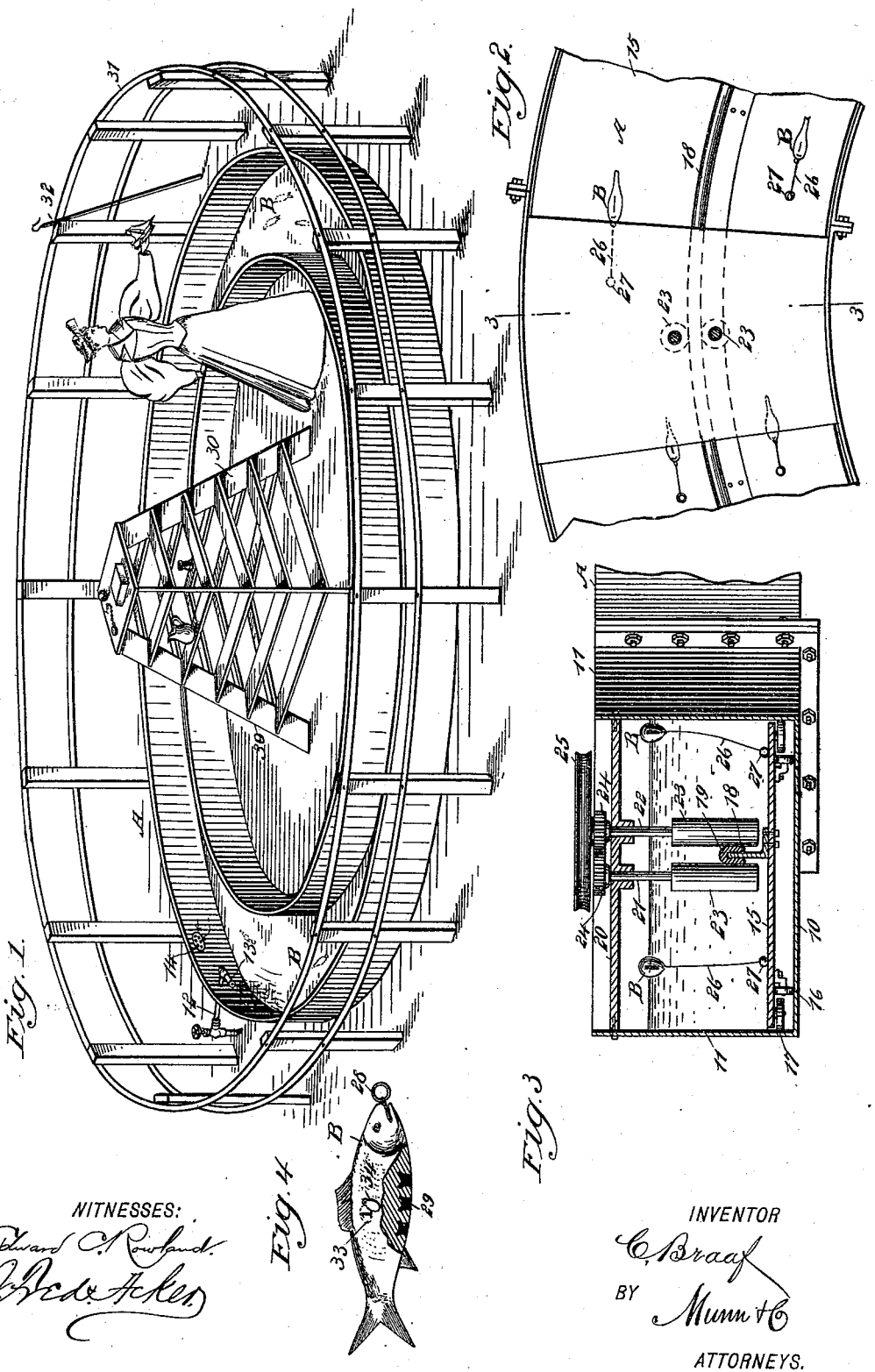
WITNESSES:
INVENTOR
C. Braaf
BY Munn & Co
ATTORNEYS.

UNITED STATES PATENT OFFICE.

CHARLES BRAAF, OF NEW YORK, N. Y.

FISH-POND.

SPECIFICATION forming part of Letters Patent No. 550,476, dated November 26, 1895.

Application filed April 13, 1895. Serial No. 545,615. (No model.)

*To all whom it may concern:*

Be it known that I, CHARLES BRAAF, of New York city, in the county and State of New York, have invented a new and useful Improvement in Fish-Ponds, of which the following is a full, clear, and exact description.

My invention relates to an improvement in fish-ponds especially adapted as an amusement, but which may be otherwise employed; and the object of this invention is to so construct the fish-pond that artificial fish may be placed therein, which fish will be kept constantly moving, the water as well as the fish being in motion or one or the other being stationary, whereby the movements of the fish are practically the same as in life, and whereby also a number of fish may be made to pass any given point.

Another object of this invention is to construct the pond or aquarium in such manner that a single attendant may entertain or wait upon a number of people grouped around the pond, and whereby also a stand for prizes or other articles to be displayed may be placed convenient to the attendant, but beyond the reach of persons fishing in the pond or looking on.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of the improved pond or aquarium. Fig. 2 is a plan view of a portion of the pond or aquarium. Fig. 3 is a transverse vertical section taken subtantially on the line 3 3 of Fig. 2, and Fig. 4 is a side elevation and partial sectional view of one of the artificial fish used in connection with the aquarium.

In carrying out the invention the pond or aquarium A is practically in the shape of a circular or oblong channel or canal, comprising a trough of either of the above shapes, said trough being made up of a bottom 10 and side pieces 11, rising at a right angle from the body. The trough is water-tight and may be of any suitable or approved material, and, as shown in Figs. 2 and 3, the trough or canal may be made in sections, so as to facilitate transportation from place to place. The trough is adapted to contain water, preferably running water, and to that end a service-pipe 12, connected with a source of water-supply, is carried through the side of the trough into the same and made to terminate in a nozzle 13, which directs the water longitudinally of the trough or canal, as shown in Fig. 1, and adjacent to the said water-supply a water overflow 14 is placed, connected with the sewer or other offtake. Therefore when the water enters the canal or trough under pressure the water will be compelled to flow the entire circumference of the trough or canal, returning practically to the inlet, and after the water has reached a predetermined height it will pass out through the overflow, thus establishing a continuous current, which will carry the fish with it, giving the appearance of swimming.

It may be desirable at times to fill the trough or canal with still water only, as shown in Fig. 3. In this event an auxiliary bottom 15 is provided for the tank, aquarium, or canal, being provided with wheels 16 on its under face adapted to travel upon the main bottom of the canal or aquarium, and likewise friction-wheels 17 are also preferably made to engage with the sides of the canal, tank, or aquarium, the said friction-wheels being also preferably made to engage with the sides of the tank, canal, or aquarium, the said friction-wheels being also secured to the under face of the auxiliary bottom. A continuous rib 18 is formed upon the auxiliary bottom at or near the center, being covered either entirely or partially with an elastic material 19, such as rubber. At a predetermined point in the length of the tank, canal, or aquarium a small platform 20 is erected near the top, extending from side to side. Two spindles 21 and 22 are projected downward through this platform, being mounted to turn therein, and each spindle at its lower end has pivoted thereon a friction-roller 23, engaging with the elastic or padded surface of the rib 18 belonging to the auxiliary bottom. Each spindle 21 and 22 is provided with a gear 24, the two gears being in mesh, as shown in Fig. 3, and upon one spindle a wheel 25 is secured, adapted to be turned by passing a belt around it, or the spindle may be rotated by other means.

It is obvious from the foregoing description that when, for example, the spindle 22 is kept rotating both spindles will be turned, and they will feed between them the rib 18, attached to the auxiliary bottom, thus causing the said auxiliary bottom to be in constant motion within the tank or canal, and the fish are adapted in this event to follow the movement of the auxiliary bottom, so that they will pass, as it were, in procession before each and every point in the length of the tank or canal. In order that the fish shall thus move with the auxiliary platform, each fish has a cable, cord, or wire 26 attached to it, preferably at the mouth, the said cable, cord, or wire being provided at its lower end with a weight 27. By dropping the weight into the water the weight will rest upon the auxiliary bottom, while the fish will float on the surface of the water. Consequently any particular fish may be drawn from the water by means of a suitable hook, or hook and line, and after the fish has been viewed it may be thrown back again into the tank, righting itself and passing along with the auxiliary bottom or platform by reason of the attached weight of the fish anchoring it in place.

It will be understood that guards may be employed to direct the weights of the fish to unobstructed portions of the platform or rolling auxiliary bottom.

One of the fish B is shown in detail in Fig. 4, and is constructed of wood or other floatable material. It is preferably provided at its mouth with an eye 28, or the equivalent thereof, whereby the fish may be hooked, and blocks 29, of a weighty material, such as lead or a metal, is introduced into the under side of the fish in order that when it is placed in the water it will float back up in a natural way.

When the tank, aquarium, or canal is in the shape above specified, a space will be provided within the inner wall of the said tank, aquarium, or canal, as shown in Fig. 1, in which is placed a stand 30, adapted to contain prizes, for example, or it may be used to display any particular object or objects, and within this space the attendant is stationed, and it is evident that from this vantage point the attendant may readily reach any individual taking up a position at any point in the circumference of the canal.

A railing 31 is usually erected around the tank, canal, or aquarium, against which the fishers may lean, employing a hook and rod 32, or their equivalent, to withdraw the fish from the water. Each fish is provided with a number or character 33 upon one of its sides, adapted to designate a correspondingly-numbered prize, and when the fish is swimming this number or character is concealed by a cover 34, and when the fish is removed from the water the cover is manipulated to expose the number or character, and the attendant will thereupon deliver to the successful fisher the prize bearing the corresponding number or character.

Having thus described my invention, I claim as new and desire to secure by Letters Patent—

1. An endless water tank, an auxiliary movable bottom in said tank and means for imparting rotary motion to the auxiliary bottom, as and for the purpose specified.

2. In a fish pond, a circular or endless tank for water, and having a dry central space defined by the inner wall of the tank adapted for the display of articles and also adapted as a walk for an attendant, floating articles in the tank, and means independent of the floating articles for keeping the water contained in the tank in motion, as and for the purpose specified.

3. In a fish pond, an endless tank, canal or aquarium, provided with a movable auxiliary bottom, means for maintaining the auxiliary bottom in motion, and fish adapted to float in water above the auxiliary bottom, being provided with anchors adapted to rest upon the said auxiliary bottom, whereby the fish and auxiliary bottom travel together, as and for the purpose specified.

4. In a fish pond, an endless tank, aquarium, or canal, an auxiliary bottom adapted to travel in the said tank, canal or aquarium, a rib formed upon the said auxiliary bottom, friction rollers engaging with opposite sides of the rib and held to turn in stationary bearings, and means for revolving the said rollers, whereby when fish are anchored on the said auxiliary bottom they will float on the top of the water and appear to travel around the tank owing to the movement of the auxiliary bottom, as and for the purpose set forth.

CHARLES BRAAF.

Witnesses:
J. F. ACKER,
F. W. HANAFORD.